(12) United States Patent
Pottebaum et al.

(10) Patent No.: US 6,929,899 B2
(45) Date of Patent: Aug. 16, 2005

(54) FLUORINATED PHOTOPOLYMER COMPOSITION AND WAVEGUIDE DEVICE

(75) Inventors: Indira S. Pottebaum, Boston, MA (US); Chuck C. Xu, Tewksbury, MA (US); Chris E. Osuch, Mine Hill, NJ (US); Deepti Pant, Woburn, MA (US); Louay A. Eldada, Lexington, MA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 396 days.

(21) Appl. No.: 10/050,185

(22) Filed: Jan. 18, 2002

(65) Prior Publication Data

US 2002/0136526 A1 Sep. 26, 2002

Related U.S. Application Data

(60) Provisional application No. 60/264,198, filed on Jan. 25, 2001.

(51) Int. Cl.[7] ............................ G03C 1/73; G03F 7/028; G03F 7/20
(52) U.S. Cl. ................. 430/285.1; 430/281.1; 430/286.1; 430/288.1; 430/270.1; 430/9; 430/18; 430/321; 430/916; 522/183; 522/182; 526/242
(58) Field of Search ..................... 430/285.1, 281.1, 430/916, 9, 18, 321, 286.1, 288.1, 270.1; 526/242; 522/183, 182

(56) References Cited

U.S. PATENT DOCUMENTS

| | | |
|---|---|---|
| 3,779,627 A | 12/1973 | Pinnow et al. |
| 4,138,194 A | 2/1979 | Beasley et al. |
| 4,609,252 A | 9/1986 | Wong et al. |
| 4,877,717 A | 10/1989 | Suzuki et al. |
| 5,054,872 A | 10/1991 | Fan et al. |
| 5,062,680 A | 11/1991 | Imamura et al. |
| 5,136,682 A | 8/1992 | Moyer et al. |
| 5,396,350 A | 3/1995 | Beeson et al. |
| 5,402,514 A | 3/1995 | Booth et al. |
| 5,462,700 A | 10/1995 | Beeson et al. |
| 5,481,385 A | 1/1996 | Zimmerman et al. |
| 5,822,489 A | 10/1998 | Hale |
| 6,005,137 A | 12/1999 | Moore et al. |
| 6,023,545 A | 2/2000 | Eldada et al. |
| 6,114,090 A | 9/2000 | Wu et al. |
| 6,162,579 A | 12/2000 | Stengel et al. |
| 6,306,563 B1 | 10/2001 | Xu et al. |
| 6,555,288 B1 * | 4/2003 | Xu et al. ............. 430/270.1 |

* cited by examiner

*Primary Examiner*—Sin J. Lee

(57) ABSTRACT

A photosensitive composition having low absorption loss at 1,300–1,610 nm and is suitable for practical waveguide devices. The composition comprises at least one (meth) acrylate prepared from a fluorinated monomer or polymer having minimum two hydroxyl groups, at least one multi-functional non-fluorinated (meth)acrylate and at least one photoinitiator. An optical coating on a variety of substrates is obtained by exposing the photosensitive composition to actinic radiation such as UV light. An optical waveguide device is fabricated by patterning the photosensitive composition on a substrate.

7 Claims, 1 Drawing Sheet

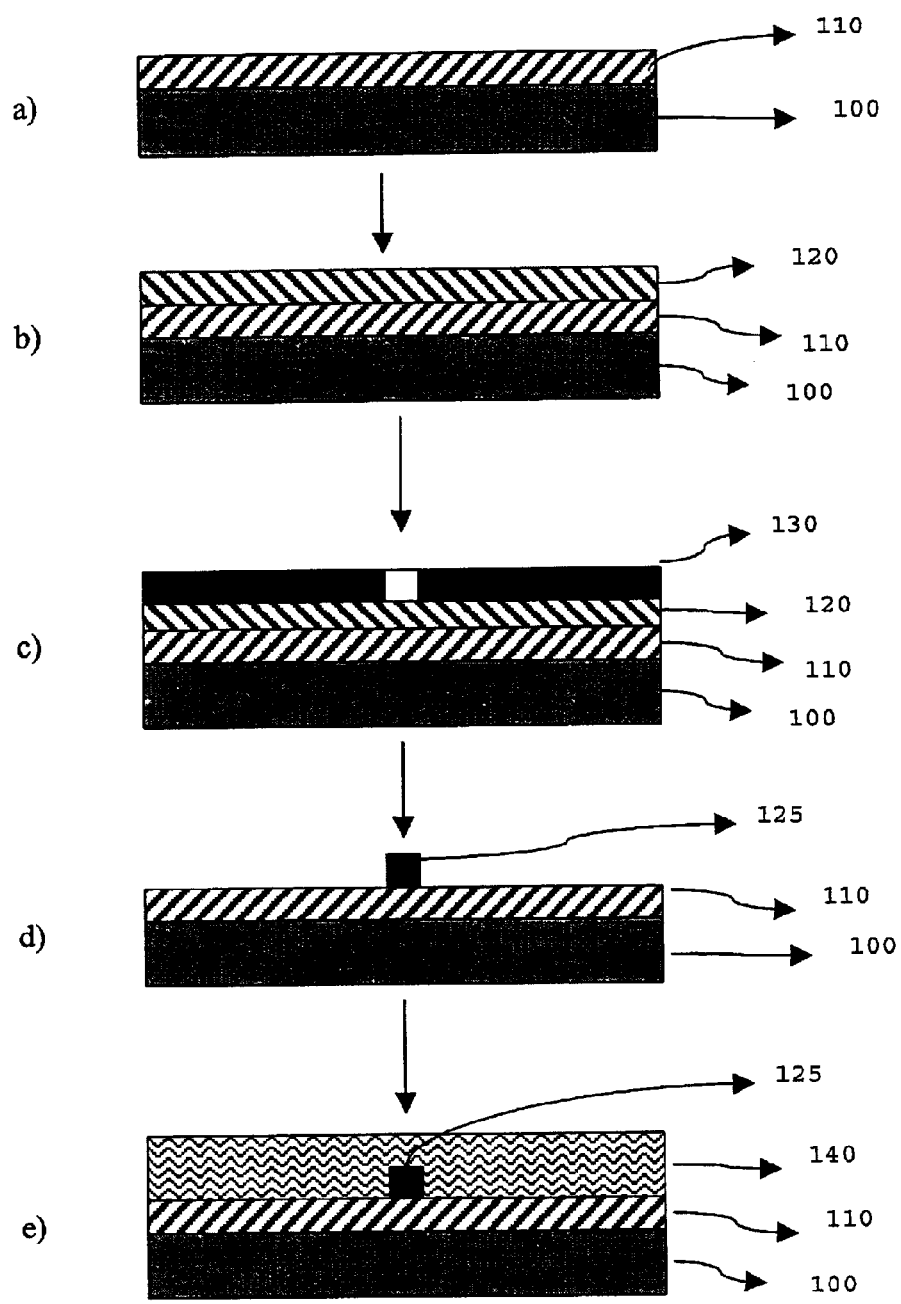
Figure 1. Fabrication of waveguides

FLUORINATED PHOTOPOLYMER COMPOSITION AND WAVEGUIDE DEVICE

PRIORITY INFORMATION

This application claims priority from provisional application Ser. No. 60/264,198 filed Jan. 25, 2001.

BACKGROUND OF THE INVENTION

1. Field of the Invention

This invention is directed to an acrylate or methacrylate (collectively referred to as (meth)acrylate in this invention) composition that is actinic radiation curable and a waveguide device fabricated with the composition. The (meth)acrylate composition demonstrates excellent coating, fast cure, high photo contrast, low optical absorption loss, high thermo-optic coefficient, and high thermal stability. The waveguide device is used in fiber optic communication networks which use single mode optical waveguides to interconnect various fiber optic devices as well as glass optical fibers.

2. Description of the Prior Art

A waveguide is a planar structure comprising of a high refractive index material in the core and low refractive index materials in the cladding that surrounds the core. The core geometry and the refractive index difference between the core and the cladding determine if the waveguide is single mode and its mode size. The waveguide can be in any form or shape depending its end use.

It is known in the art that a photosensitive composition can be patterned by UV light, e-beam, reactive ion etching (RIE) and lasers to produce waveguide structures. One method used to form waveguides involves the application of standard photolithography processes. A chosen pattern in a photosensitive polymer layer deposited on a substrate is defined with a photo mask using the photolithographic process. Another method used to fabricate waveguides involves the use of RIE. Among the many known photosensitive polymers, (meth)acrylate materials have been widely studied as waveguide materials because of their optical clarity and low birefringence. The details of the prior art are described in U.S. Pat. Nos. 4,609,252; 4,877,717; 5,054,872; 5,136,682; 5,396,350; 5,402,514; 5,462,700; 5,481,385; 6,023,545; 6,114,090, which are incorporated herein by reference.

The waveguides used for telecommunications applications come in a variety of forms and shapes and can be used to produce fiber optic components such as thermo-optic switches, splitters, combiners, couplers, filters, attenuators, wavelength cross connects, channel monitors, and add-drop multiplexers. The fiber optic applications require that the materials and their waveguide devices meet certain specifications such as low optical insertion loss, high thermo-optic coefficient, low birefringence, and high reliability. It is often very challenging and takes a unique material and device approach to meet all the requirements.

To achieve low insertion loss it is necessary to simultaneously realize low absorption and scattering losses of the waveguides in the telecommunication wavelength region of 1,300–1,610 nm and low coupling loss between the waveguides and their pigtailed fibers. To realize low absorption loss it is required to use materials that have low absorption at 1,300–1,610 nm. To realize low scattering loss it is required to use materials and device fabrication processes that allow for homogeneity and minimize stress. Waveguides should have matching optical fibers in both cross section and mode size to realize low coupling loss. To realize the matched cross section and mode size, high contrast materials are utilized to control the waveguide size as well as the capability to control refractive indexes of the materials.

Although the prior art teaches how to fabricate waveguides with photo polymers, practicing of the prior art has not led to devices that meet all the requirements for practical use in telecommunication networks. Typical prior art devices use hydrocarbon materials that have very high absorption loss in the wavelength region of 1,300–1,610 nm. Also prior art devices use materials that have high shrinkage upon curing, leading to high residual stress and hence high scattering loss. All these losses lead to devices that have unacceptably high insertion loss.

Prior art references such as U.S. Pat. Nos. 3,77,9627; 4,138,194; 5,062,680; 6,005,137, which are herein incorporated by reference, have taught that replacing hydrocarbon bonds with fluorocarbon bonds or deuterium-carbon bonds will reduce the absorption loss of an organic material at 1,300–1,610 nm wavelengths. Replacing hydrogen with fluorine in a material also decreases the refractive index of the material. Fluorinated photosensitive materials including (meth)acrylates have been used to fabricate waveguides. However these (meth)acrylates are of low molecular weight and are mono functional. There are several drawbacks to such materials. First of all, the relatively low level of fluorination is insufficient to lower the optical loss to the required level. Second, it is difficult to fully cure mono functional monomers with UV light. The residual monomer will cause reliability and environmental problems. Third, the low molecular weight of the monomers leads to very high shrinkage (up to 20%) upon curing. The high shrinkage causes high residual stress, which leads to such problems as high light scattering and poor reliability. Fourth, the high volatility of low molecular weight monomers impairs production of waveguides. The highly volatile monomers not only contaminate the curing chamber but also make it extremely difficult to achieve consistent material properties including refractive index after curing. Fogging of the photo mask used to pattern the waveguides is also a problem. Fifth, the cured polymers are brittle and the devices made from them crack upon baking or bending. Even microcracks will cause high light scattering. Sixth, the monomers do not have sufficient viscosity to spin coat consistently uniform films with the thickness required to match the cross-section of the optical fibers.

The ability to fabricate waveguides having the required dimensions, contrast and mode size depends on a number of interacting variables. These include the chemical and physical characteristics of the materials used including the viscosity, volatility, shrinkage, functionality, photo reactivity, photo contrast, and refractive index. Therefore there is a need to have a composition that addresses all of the above issues.

SUMMARY OF THE INVENTION

A photosensitive composition suitable for practical waveguide devices provides for low absorption loss in the spectral region from 1,300 to 1,610 nm, high photo contrast, controllable refractive index, low volatility, low curing shrinkage, non-brittleness, sufficient viscosity, complete curing by UV, excellent chemical stability, and good mechanical flexibility. The photosensitive composition comprises:

a. at least one (meth)acrylate prepared from a fluorinated monomer or polymer having at least two hydroxyl groups, the (meth)acrylate having a number average molecular weight of at least 400;

b. at least one non-fluorinated (meth)acrylate which is soluble in the fluorinated (meth)acrylate of (a) and having at least two (meth)acrylate groups per molecule; and c. at least one photoinitiator which is soluble in the fluorinated (meth)acrylate of (a).

It is an object of the invention to provide a photosensitive composition for use in waveguides.

It is another object of the invention to provide a photosensitive composition which provides for low absorption loss, high photo contrast, controllable refractive index, low volatility, low curing shrinkage, non-brittleness, sufficient viscosity, complete curing by UV, chemical stability and good mechanical flexibility.

Another object of the invention is to provide an optical coating by exposing the composition to actinic radiation such as UV light.

A further object of the invention is to apply the coating varnish onto a substrate which is cured into a polymer coating on a variety of substrates.

Still another object of the invention is to provide a waveguide device formed by patterning the photosensitive composition.

BRIEF DESCRIPTION OF THE DRAWINGS

Other objects, features and advantages of the present invention will become apparent in light of the following detailed description in connection with the accompanying drawings, wherein:

FIGS. 1a–e illustrates a schematic of the fabrication of a waveguide.

DETAILED DESCRIPTION OF PREFERRED EMBODIMENTS

The photopolymer composition of the present invention includes:

a. at least one (meth)acrylate prepared from a fluorinated monomer or polymer having at least two hydroxyl groups, wherein the (meth)acrylate has a number average molecular weight of at least 400;

b. at least one non-fluorinated (meth)acrylate which is soluble in the fluorinated (meth)acrylate of (a) and has at least two (meth)acrylate groups per molecule;

c. at least one photoinitiator which is soluble in the fluorinated (meth)acrylate of (a); and d. optional additives such as but not limited to contrast enhancers, UV stabilizers, antioxidants, surfactants, adhesion promoters, viscosity thickeners.

The composition comprises approximately 60–99% of the fluorinated (meth)acrylate, 0.9–39.9% of the non-fluorinated (meth)acrylate, and 0.1–10% of the photoinitiator. Preferably the composition comprises 80–98% of the fluorinated (meth)acrylate, 1.8.0–19.8% of the non-fluorinated (meth) acrylate, and 0.2–5.0% of the photoinitiator. Preferably, the photoinitiator is a mixture of two different photoinitiators with one favoring surface cure and the other favoring through cure.

The fluorinated (meth)acrylates are prepared from fluorinated monomers or polymers having at least two hydroxyl groups. The hydroxy containing materials are converted to (meth)acrylates by reacting the hydroxy containing materials with (meth)acryloyl chloride in the presence of a suitable amine. Suitable hydroxy containing fluorinated monomers and polymers have the following formula:

wherein Rf is a fluorinated moiety such as alkyl, alkyl oxide, aryl, aryl oxide, alkylene, alkylene oxides, arylene, arylene oxide, and their polymers; X is a divalent, trivalent or tetravalent hydrocarbon link such as alkylene, alkylene oxides, arylene, arylene oxide, and their polymers, wherein X preferably contains 2–20 carbons; m is 1–4, preferably 1–2; and n is 1–12, preferably 2–4.

The fluorinated (meth)acrylate should have a number average molecular weight of at least 400, preferably 500 and more preferably 1000. The high molecular weight of the (meth)acrylate provides for several advantages. First, the high molecular weight lowers shrinkage upon curing due to the relatively low volume fraction of the acrylate group. As previously discussed, it is known in the art that low molecular weight acrylates can have shrinkage of up to 20% when cured. The photosensitive composition of this invention has shrinkage of 5% or lower, and preferably 2% or lower. Second, the high molecular weight provides for low volatility. The low volatility is important to maintain a stable coating composition. Third, high molecular weight provides for high viscosity. It is known in the art that a coating formulation must have a minimum viscosity to form a uniform coating of sufficient thickness. The photosensitive composition of this invention has a viscosity of 40 cP or higher to consistently fabricate waveguides with a cross-section that matches the cross-section of the optical fibers.

Preferably the fluorinated (meth)acrylate has fluorine-to-hydrogen ratio of 1:1 or higher and more preferably 2:1 or higher. High fluorine-to-hydrogen ratio yields low absorption loss at the near IR wavelength region of 1300–1610 nm.

More preferably at least one fluorinated (meth)acrylate in the photosensitive composition of this invention is prepared from an ethoxylated polymer having the formula:

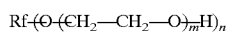

wherein Rf is a fluorinated moiety, m=1–12 and n=2–6, preferably m=1–4 and n=2–4. Preferably Rf has a fluorine-to-hydrogen ratio of at least 3:1, more preferably at least 5:1. The ethoxy link facilitates compatibility of the fluorinated (meth)acrylate with other non-fluorinated components such as the photoinitiator and the non-fluorinated (meth)acrylate in the composition of this invention. It is preferred that the length of the ethoxy link has 20 and preferably 12 or less C atoms to minimize optical loss in the 1300–1610 nm wavelength region.

Most preferably the acrylates are prepared from fluoropolyether diols. Such acrylates provides for low glass transition temperature (Tg) coatings after curing. It is known in the art that a polymer above its Tg exhibits high coefficient of thermal expansion (CTE) and low modulus, which in turn allow for high thermo-optic (TO) coefficients and low stress. High TO coefficient allows for a TO device with low power consumption and high tunability. Low stress reduces scattering optical loss and improves reliability.

Examples of fluorinated hydroxy containing monomers or polymers include but are not limited to 1H, 1H, 9H, 9H-perfluoro-1,9-nonanediol, 1H, 2H, 3H, 3H-perfluorononane-1,2-diol, 1H, 1H, 10H, 10H-perfluoro-1,10-decanediol, 1H, 1H, 12H, 12H-perfluoro-1,12-dodecanediol, 1H, 1H, 16H, 16H-perfluoro-1,16-hexadecanediol, fluoropolyalkylene diol, ethoxylated fluoropolyalkylene diols, fluoropolyether diols having the following structures:

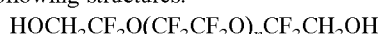

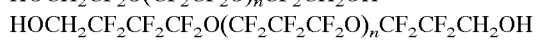

HOCH₂CF₂CF₂CF₂O(CF₂CF₂CF₂CF₂O)ₙ
CF₂CF₂CF₂CH₂OH
HOCH₂CF₂O(CF₂CF₂O)ₘ(CF₂CF₂CF₂CF₂O)ₙ
(CF₂CF₂O)ₘCF₂CH₂OH and
HOCH₂CF₂O(CF₂CF₂O)ₘ(CF₂CF₂CF₂O)ₙCF₂CF₂O
(CF₂CF₂CF₂O)ₙ(CF₂CF₂O)ₘCF₂CH₂OH
wherein m and n are integers, and other perfluoropolyether and ethoxylated perfluoropolyether diols such as Fluorolink D, D10, E and E10 commercially available from Ausimont USA, of Thorofare, N.J., as well as other various fluorinated diols known to those skilled in the art.

In a preferred embodiment the fluorinated alcohols are converted into (meth)acrylates using a hindered tertiary amine. The amine should contain at least one tertiary or quaternary carbon atom. The hindered amine provides for advantages, as compared to commonly used triethylamine, in reducing yellowness of the products and eliminating the water washing process normally needed to remove residual ammonium salts formed during the acrylation reaction. Non-exclusive examples of suitable hindered amines include N,N-dimethylisopropylamine, N,N-diisopropylethylamine, triisobutylamine, Julolidine, iminodibenzyl, 2-methylpyridine, 2,6-lutidine, 2,4,6-collidine, and others known to those skilled in the art.

The non-fluorinated (meth)acrylate is used to tailor the refractive index of the photosensitive composition and render fast cure, high crosslinking density and good adhesion to substrates and metals. This (meth)acrylate should be soluble in the fluorinated (meth)acrylate of this invention. The non-fluorinated (meth)acrylate has at least two (meth)acrylate groups per molecule. Preferably the (meth)acrylate has at least three (meth)acrylate groups per molecule; and more preferably the (meth)acrylate has low volatility and has a refractive index, $n_D^{20}$, of at least 1.45.

Examples of suitable (meth)acrylates include but are not limited to ethylene glycol di(meth)acrylate, diethylene glycol di(meth)acrylate, triethylene glycol di(meth)acrylate, tetraethylene glycol di(meth)acrylate, trimethylolpropane tri(meth)acrylates, trimethylolpropane ethoxylate tri(meth)acrylates, di-trimethylolpropane tetra(meth)acrylate, pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, tripentaerythritol octa(meth)acrylate, sorbitol tri(meth)acrylate, sorbitol tetra(meth)acrylate, sorbitol penta(meth)acrylate, sorbitol hexa(meth)acrylate, oligoester (meth)acrylates and mixtures thereof.

The composition comprises at least one photoinitiator which generates free radicals upon exposure to an actinic radiation. The chosen photoinitiator is soluble in the fluorinated (meth)acrylate of this invention and is preferably thermally inactive below about 50° C. Examples of suitable photoinitiators include but are not limited to aromatic ketones, benzil ketals, benzoin and benzoin ethers, and phosphine oxides such as benzophenone, benzyl dimethyl ketal, benzoin alkyl ether, 1-hydroxy-cyclohexyl-phenyl ketone, benzodimethyl ketal, α,α-dimethyloxy-α-hydroxy acetophenone, 1-[4-(2-hydroxyethoxy)phenyl]-2-hydroxy-2-methyl-propan-1-one, 2-methyl-1-[4-methylthio)phenyl]-2-morpholino-propan-1-one, 2-benzyl-2-dimethylamino-1-(4-morpholinophenyl)-butan-1-one and 2,4,6-trimethylbenzoyldiphenyl-phosphine oxide. The preferred photoinitiator composition is a mixture of at least two photoinitiators with different extinction coefficients and absorption maxima. A mixed photoinitiator enables high photo contrast as well as rapid curing speed. Examples of such mixtures include but are not limited to benzodimethyl ketal with α,α-dimethyloxy-α-hydroxy acetophenone and 2,4,6-trimethylbenzoyldiphenylphosphine oxide with α,αdimethyloxy-α-hydroxy acetophenone.

Optional additives may be added to the photosensitive composition to enhance certain properties such as thermal stability, chemical stability, coating quality and photo contrast. Examples of the additives include but are not limited to surfactants, contrast enhancers, photostabilizers, UV absorbers, antioxidants, and dyes. The surfactants may include fluorinated surfactants such as Fluorad from 3M (of St. Paul, Minn.) and polyethers such as BYK-3500 from BYK Chemie USA of Wallingford, Conn. Suitable contrast enhancers include free radical scavengers, particularly photo bleachable free radical scavengers such as the nitrones disclosed in U.S. Pat. No. 6,162,579. Photostabilizers include hindered amines such as Cyasorb UV3346 from Cytec Industries of West Paterson, N.J. and TINUVIN 123S from Ciba Specialty Chemicals of Tarrytown, N.Y. UV absorbers include benzotriazoles such as TINUVIN 234 from Ciba Specialty Chemicals and benzophenone derivatives such as UVINUL from BASF of Mount Olive, N.J. The antioxidants include, for example, hindered phenols such as Irganox 1010 from Ciba Specialty Chemicals. The dyes include methylene green, methylene blue, and the like. An optical coating may be formed by coating the photosensitive composition on a substrate followed by exposure to an actinic radiation. The composition can be coated on a variety of substrates including but not limited to silicon, glass, quartz, plastic and metals. The photopolymer coating demonstrates high optical clarity, good thermal stability and good adhesion to the substrates.

A waveguide device is fabricated by patterning the photosensitive composition on a substrate. Preferably the photosensitive composition is patterned with an actinic radiation. The process of waveguide fabrication with UV light is illustrated in FIG. 1 and includes the following steps:

a) forming a thin layer of a first composition on a substrate 100 to form a bottom cladding layer 110 with a first refractive index, $n_1$;

b) coating a thin layer 120 of a second composition using the photosensitive composition of this invention on top of layer 110;

c) patternwise expose layer 120 to an actinic radiation using a photomask 130 to form a latent image;

d) removing the non-exposed region with an organic solvent to form a waveguide rib 125 with a second refractive index, $n_2$, that is higher than $n_1$; and e) coating a thin layer of a third composition on top of layer 110 and 125 to form a top cladding layer 140 with a third refractive index, $n_3$, that is lower than $n_2$.

The substrate may be any material including silicon, silicon oxide, gallium arsenide, silicon nitride, metal, metal oxide, glass, quartz, plastics, rubbers, ceramics, crystals, or the combinations thereof. Optionally the substrates may be treated with primers and adhesion promoters to enhance the adhesion between the substrate and the waveguide. Also optionally the substrates are coated with an anti-reflective coating layer to reduce effects of back reflection and improve device performance.

Although the bottom and top cladding layers can be made of any materials as long as they have lower refractive index than the core layer, it is preferred that all three layers are formed using varied photosensitive compositions of this invention. The bottom cladding layer and the top cladding layer may have the same or different compositions. They may have the same or different refractive indexes but they both should have refractive indexes lower than that of the core layer. The refractive index of the photosensitive composition can be tailored by adjusting the ratios among all the components, particularly the ratio between the fluorinated and non-fluorinated (meth)acrylates.

The actinic radiation used can be any light in the visible and ultraviolet regions of the spectrum. Preferably the actinic radiation is UV light. The UV sources, wavelengths, intensity, and exposure procedures may be varied to achieve the desired curing degree, waveguide geometry and other factors known to those skilled in the art. Useful UV sources are high pressure xenon or mercury-xenon arc lamps fitted with appropriate optical filters.

After the photosensitive composition has been cured to form the predetermined pattern, the pattern is developed with a solvent. Examples of development methods include but are not limited to spray, flushing and puddle developing. Many solvents such as alcohols, ketones, ethers and esters are suitable as developers for this invention. Examples of the developers include acetone, methyl ethyl ketone, methanol, ethanol, isopropanol, ethyl acetate, tetrahydrofuran, perfluoroethers and mixtures thereof.

Although only one type of optical device is described in detail in this disclosure many other types of devices can be fabricated using the photosensitive composition of this invention. These include thermo-optic devices, electro-optic devices and magneto-optic devices such as but not limited to couplers, switches, attenuators, filters, multiplexers, demultiplexers, isolators, circulators, chromatic dispersion compensators, polarization mode dispersion compensators, wavelength converters, modulators, lasers, amplifiers, and detectors.

Prior art disclosures have taught the fabrication of thermo-optic devices and their use in fiber optic networks. See for example M. B. J. Diemeer, Optical Materials 9 (1998) 192 and references therein. In a typical thermo-optic device a resistive heater deposited on a waveguide structure is used to heat part of the structure. The refractive index of the heated part changes with increasing temperature. This index change is used to switch, attenuate or tune light transmitted through the waveguide structure. A thermo-optic device can be produced using the photosensitive composition and waveguide device of the present invention by employing a resistive heater.

An optical grating device can also be produced using the photosensitive composition of the present invention. Gratings are wavelength filter elements, and they can be Bragg gratings or diffraction gratings. A Bragg grating is obtained by alternating in a waveguide the refractive index periodically about an average effective refractive index, creating an in-line series of weakly reflecting mirrors. The cumulative effect of the mirrors is to maximally reflect a certain wavelength. Such grating devices can be used as optical filters. When thermo-optic tuning is desired, a resistive heater can be placed in the proximity of the grating. The refractive index in the grating changes with temperature, causing the reflected wavelength to change.

EXAMPLES

The following non-limiting examples are given to illustrate the invention. Variations in composition of the photosensitive composition and the processes to fabricate a waveguide should be apparent to those skilled in the art and are within the scope of this invention.

Example A

Shrinkage Measurement: A layer of liquid composition (about 10 m thick) is coated onto a silicon wafer. The thickness of the liquid ($d_L$) is measured with a Filmetrics F20 thickness tester (available from Filmetrics, San Diego, Calif.). The liquid coating is exposed to 10 mJ/cm$^2$ UV light using an 800W mercury xenon lamp. The thickness of the solid film ($d_s$) obtained is measured again with the Filmetrics tester. The shrinkage (S) is calculated using the following equation:

$$S=1-d_s/d_L$$

Example 1

To a 3-neck flask was added 1 equivalent of 1H, 2H, 3H, 3H-perfluorononane-1,2-diol, and anhydrous ether at 0.3–0.4 M. To the ether solution was added 2.2 equivalent of anhydrous diisopropylethylamine under argon. While stirring 2.2 equivalent of anhydrous acryloyl chloride was added dropwise. The mixture was stirred for 4 h at room temperature and then 0.4 equivalent of methanol was added to neutralize excess acryloyl chloride. The resulting mixture was filtered through Celite/silica to remove salt precipitate. The filtrate was concentrated to yield a clear liquid diacrylate with a molecular weight of 502.

Example 2

To a 3-neck flask was added 1 equivalent of 1H, 1H, 16H, 16H-perfluoro-1,16-hexadecanediol as an anhydrous ether solution (0.3–0.4 M). To the ether solution was added 2.2 equivalents of anhydrous diisopropylethylamine under argon. While stirring, 2.2 equivalents of acryloyl chloride was added dropwise. The mixture was stirred for 4 h at room temperature and then 0.4 equivalent of methanol was added to neutralize excess acryloyl chloride. The resulting mixture was filtered through Celite/silica to remove salt precipitate. The filtrate was concentrated to yield a clear liquid diacrylate with molecular weight of 838.

Example 3

To a 3-neck flask was added 1 equivalent of Fluorolink E, a fluorinated diol, available from Ausimont USA, as an anhydrous ether solution (0.3–0.4 M). To the ether solution was added 2.2 equivalents of anhydrous diisopropylethylamine under argon. While stirring, 2.2 equivalents of anhydrous acryloyl chloride was added dropwise. The mixture was stirred for 6–8 h at room temperature and then 0.4 equivalent of methanol was added to neutralize excess acryloyl chloride. The resulting mixture was filtered through Celite/silica to remove salt precipitate. The filtrate was concentrated to yield a clear liquid Fluorolink E diacrylate with number average molecular weight of about 2,100.

Example 4

To a 3-neck flask was added 1 equivalent of Fluorolink E10 as an anhydrous ether solution (0.3–0.4 M). To the ether solution was added 2.2 equivalents of anhydrous diisopropylethylamine under argon. While stirring, 2.2 equivalents of anhydrous acryloyl chloride was added dropwise. The mixture was stirred for 6–8 h at room temperature and then 0.4 equivalent of methanol was added to neutralize excess acryloyl chloride. The resulting mixture was filtered through Celite/silica to remove salt precipitate. The filtrate was concentrated to yield a clear liquid Fluorolink E10 diacrylate with number average molecular weight of about 1,100.

Example 5

A photosensitive composition is prepared by mixing 18 parts of the diacrylate prepared in Example 2, 10 parts of trimethylolpropane triacrylate, 70 parts of Fluorolink E10 diacrylate synthesized in Example 4, 1.5 parts of the photoinitiator Darocur 1173 available from Ciba Specialty Chemicals, and 0.5 part of the photoinitiator Darocur 4265 also available from Ciba Specialty Chemicals. The viscosity of the formulation is about 50 cP measured by a Brookfield LV-DV viscometer at 23° C.

Example 6

An optical coating was formed by coating the photosensitive composition prepared in Example 5 on a glass substrate with a Meyer rod. The wet coating is exposed to 100 mJ of UV using a 1000W mercury xenon lamp, with maximum output at 365 nm, under blanket nitrogen protection. The film is clear and transparent. The shrinkage is about 2%.

Example 7

A photosensitive composition is prepared by mixing 92 parts of Fluorolink E10 diacrylate synthesized in Example 4, 5.5 parts of SR355, a tetrafunctional acrylate from Sartomer, 2 parts of photoinitiator Darocur 1173 and 0.5 part of photoinitiator Darocur 4265. The viscosity of the formulation is about 60 cP at 23° C. The refractive index measured with an Abbe refractometer at 23° C. is 1.358. When cured by 10 mJ UV the shrinkage is about 1%.

Example 8

A photosensitive composition is prepared by mixing 96 parts of Fluorolink E10 diacrylate synthesized in Example 4, 2 parts trimethylolpropane triacrylate, and 2 parts of the photoinitiator Darocur 1173. The viscosity of the formulation is about 53 cP at 23° C. The refractive index measured with an Abbe refractometer at 23° C. is 1.351. When cured by 10 mJ UV the shrinkage is about 1%.

Example 9

A photosensitive composition is prepared by mixing 92 parts of Fluorolink E10 diacrylate synthesized in Example 4, 6 parts of trimethylolpropane triacrylate, 1.5 parts of the photoinitiator Darocur 1173, and 0.5 part of the photoinitiator Darocur 4265. The viscosity of the formulation is about 58 cP at 23° C. The refractive index measured with an Abbe refractometer at 23° C. is 1.357. When cured by 10 mJ UV the shrinkage is about 1%.

Example 10

An optical coating was formed by coating the photosensitive composition prepared in Example 11 onto a polyimide film with a Meyer rod. The wet coating is exposed to 100 mJ of UV using an 800W mercury xenon lamp, with maximum output at 365 nm,

Example 11

A waveguide device was fabricated with the following processes.
  a) A 12 µm layer of the photosensitive composition prepared in Example 8 was spin coated onto an oxidized silicon wafer. The wafer was exposed to 5 mJ/cm² UV light using an 800W mercury xenon lamp, having a maximum output of 365 nm, to partially cure the composition and to form a solid bottom cladding layer;
  b) a 8 µm layer of the photosensitive composition prepared in Example 9 was spin coated on top of the bottom cladding layer. A photomask having the desired features was placed above the coating. The wafer was then exposed to 2 mJ/cm² V using an 800W mercury xenon lamp, having a maximum output of 365 nm, to cure the composition and form a solid core layer with a latent image;
  c) the imaged core layer was developed with ethyl acetate to remove the non-exposed regions to form waveguide ribs;
  d) a 12 µm layer of the photosensitive composition prepared in Example 8 was spin coated on top of the developed core layer and the bottom cladding layer. The wafer was exposed to 400 mJ/cm² UV using the 800W mercury xenon lamp to cure the composition and to form a solid top cladding layer; and the wafer was baked at 130° C. for 1 hour to yield a channel waveguide device.

Although the present invention has been shown and described with respect to several preferred embodiments thereof, various changes, omissions and additions to the form and detail thereof, may be made therein, without departing from the spirit and scope of the invention.

What is claimed is:

1. A composition comprising,
  a) at least one fluorinated (meth)acrylate prepared from a fluorinated monomer or polymer having at least two hydroxyl groups per molecule;
  b) at least one non-fluorinated (meth)acrylate, said at least one non-fluorinated (meth)acrylate being soluble in said fluorinated (meth)acrylate, said non-fluorinated (meth)acrylate having at least two (meth)acrylate groups per molecule; and
  c) at least one photoinitiator, said photoinitiator being soluble in the fluorinated (meth)acrylate;
  wherein said at least one fluorinated (meth)acrylate is prepared from an ethoxylated fluoropolymer having the following formula:

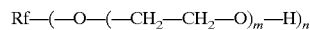

wherein Rf is a fluorinated moiety having a F/H ratio of at least 3:1, m=1–10, and n=2–6.

2. The composition of claim 1, wherein said at least one fluorinated (meth)acrylate has a number average molecular weight of at least 400.

3. The composition of claim 1, wherein said at least one non-fluorinated (meth)acrylate has at least 3 (meth)acrylate groups per molecule.

4. The composition of claim 1 wherein the fluorinated (meth)acrylate is prepared from a fluorinated hydroxy-containing monomer or polymer and (meth)acryloyl chloride using a hindered tertiary amine, said amine having at least one tertiary or quaternary carbon atom.

5. The composition of claim 4 wherein the hindered tertiary amine is N,N-diisopropylethylamine.

6. The composition of claim 1 further comprising additives selected from the group consisting of contrast enhancers, UV stabilizers, antioxidants, surfactants, adhesion promoters, and viscosity thickeners.

7. A polymer coating formed by exposing the composition of claim 1 to an actinic radiation.

* * * * *